United States Patent [19]

Shapira

[11] Patent Number: 5,086,394
[45] Date of Patent: Feb. 4, 1992

[54] INTRODUCTION SYSTEM FOR LOCATING COMPATIBLE PERSONS

[76] Inventor: Shmuel Shapira, 225 S. Reeves Dr., #5, Beverly Hills, Calif. 90212

[21] Appl. No.: 501,268

[22] Filed: Mar. 29, 1990

[30] Foreign Application Priority Data

May 12, 1989 [IL] Israel ..................... 090277

[51] Int. Cl.⁵ .................. G06F 15/38; G08B 5/22; G08B 1/123; G08G 1/123
[52] U.S. Cl. .................. 364/419; 340/825.44; 340/993; 340/407
[58] Field of Search .............. 364/419; 340/825.44, 340/407, 993

[56] References Cited

U.S. PATENT DOCUMENTS

| | | | |
|---|---|---|---|
| 3,696,384 | 4/1972 | Lester | 340/312 |
| 3,772,668 | 11/1973 | Smith | 340/224 |
| 3,839,717 | 7/1974 | Paul | 343/6.5 LC |
| 3,858,212 | 9/1974 | Tompkins et al. | 343/100 CS |
| 3,970,824 | 3/1976 | Walton et al. | 235/61.11 |
| 4,107,675 | 3/1978 | Sellers et al. | 343/6.5 LC |
| 4,121,102 | 1/1978 | Wilson | 250/341 |
| 4,173,016 | 10/1979 | Dickson | 340/407 |
| 4,225,953 | 9/1980 | Simon et al. | 367/117 |
| 4,263,595 | 4/1981 | Vogel | 343/6.5 SS |
| 4,275,385 | 11/1981 | White | 340/312 |
| 4,348,740 | 9/1982 | White | 364/419 |
| 4,348,744 | 9/1982 | White | 364/419 |
| 4,476,469 | 4/1984 | Lander | 340/825.49 |
| 4,495,495 | 12/1985 | Ormanns et al. | 340/825.45 |
| 4,495,496 | 6/1985 | Miller, III | 340/825.54 |
| 4,510,495 | 10/1985 | Sigrimis et al. | 340/825.54 |
| 4,556,883 | 2/1985 | Strietzel | 340/825.54 |
| 4,595,922 | 4/1986 | Cobb et al. | 340/825.49 |
| 4,598,272 | 4/1986 | Cox | 340/539 |
| 4,644,350 | 2/1987 | Ishii | 340/825.44 |
| 4,644,351 | 2/1987 | Zabarsky et al. | 340/825.44 |
| 4,661,972 | 1/1987 | Kai | 379/57 |
| 4,663,625 | 3/1987 | Yewen | 340/825.54 |
| 4,688,026 | 7/1987 | Scribner et al. | 340/572 |
| 4,739,328 | 9/1988 | Koelle et al. | 342/44 |
| 4,740,788 | 8/1988 | Konneker | 340/825.44 |
| 4,752,951 | 3/1988 | Konneker | 379/211 |

FOREIGN PATENT DOCUMENTS 0125143 11/1984 European Pat. Off. .
0189089 1/1986 European Pat. Off. .
3508448 7/1986 Fed. Rep. of Germany .
8703139 12/1987 France .

OTHER PUBLICATIONS

Sanger, Elizabeth; "Mating by Computer: A New Service Seeks to Match Inventors with Ventures"; Sep. 3, 1984, Barron's, p. 32.

Baig, Edward C.; "Making Money Helping Singles Mingle", Fortune, vol. III No. 4, Feb. 18, 1985, pp. 98–103.

Dial-A-Match; Clapp, D.; inforworld vol. 6; issue: No. 19 p. 38; 5/7/84.

Saturday Night Beeper; Grevstad, E.; 80 Micro p. 334; 7/83.

Looking for Mr. Right; Chin, K.; Inforworld; vol. 6 Issue: No. 28; pp. 28-30.

Meeting Your Match Online; Meyer, C.A.; 7/84; Link-Up vol. 1 Issue: No. 10; p. 38-40.

Some Computers Shoot Electronic Arrows; Yuen, M. Softalk vol.: V3 Issue: No. 6; pp. 164-168.

Primary Examiner—Dale M. Shaw
Assistant Examiner—Xuong M. Chung
Attorney, Agent, or Firm—Darby & Darby

[57] ABSTRACT

An introduction system for participating users, includes for each user a personal device that is subject to activation by remote paging. Each user, also has a memory device that contains personal data defining the user by personal characteristics such as traits and interests. A local control unit receives the respective personal data from a plurality of user memory devices and using computer means compares the personal data of each user with the personal data of other users who have within the same time frame entered their personal data into the local control unit via their respective memory devices. Pairs who are matched to predetermined standards by the computer comparison are automatically paged via their personal devices and an introduction is facilitated.

27 Claims, 5 Drawing Sheets

INTRODUCTION SYSTEM FOR LOCATING COMPATIBLE PERSONS

BACKGROUND OF THE INVENTION

This invention relates generally to systems for introducing people who are desirous of making new acquaintances, and more particularly to an introduction system that seeks, substantially immediately, to bring together people having compatible traits and interests. In the past, a variety of systems has been suggested for introducing persons to each other. These systems have been rather simple and did not fulfill the expectations of the parties. None of the suggested systems attained commercial success.

Introductions effected by dating or marriage agencies suffer from several drawbacks. Prospective partners have no way of assessing the situation prior to actually meeting, generally because the initial meeting has to be pre-arranged for a specific future time. It is quite common for either or both individuals to be in a particularly unreceptive mood at the appointed time, especially because the prospective couple has had no input in arranging an actual meeting. Agencies will eventually provide some introduction regardless of actual favorable prospects for a successful match. The user of such services has no control over who will be the recipient of his/her name and address, with the additional inherent danger that such information can be easily circulated. Further, days and weeks may pass before a first meeting is achieved.

Singles' bars and clubs theoretically offer to overcome some of the problems associated with dating agencies but possess several inherent drawbacks of their own. Although immediate contacts are available, potential partners have no prior information about each other and there is the problem of "ice-breaking", that is finding a suitable basis and the privacy to introduce oneself to a total stranger. The only evidence that a "match" is possible is the presence of both persons at the same place and time.

U.S. Pat. No. 4,173,016 to Dickson offers an "on the spot" introduction system for the situation where prospective couples are in the same immediate area, for example, at a dance. In this patent, a first party has a short-range transmitter/receiver that identifies the first party and a very limited number of characteristics of the second party that the first party is seeking to meet. All of the potential second parties in the zone where the first party is operating, the dance, have receivers/transmitters that contain corresponding data indicative of the person that the potential second parties would be willing to meet.

A potential second party receiver device interprets the first party's request and, if a suitable match is found, the second party's unit transmits a signal that is received by the first party. After that, a hunting process ensues wherein the strength of the exchanged signals depends upon the closeness of the parties. The parties search until they meet.

This system is strictly one-to-one whereby the receiver device only accepts one response that matches the required parameters. Further simultaneous inquiries and responses will either jam the first signal or not be acknowledged at all. This system thus only accepts a first match, not necessarily the best match available. By its nature, the more people using the Dickson system, the more jamming problems there will be. Therefore, use of the Dickson system is restricted to a limited gathering and minimal range of distance where the two people have to be virtually within sight of each other. Also, this system is highly limited with regard to the number of parameters that are matched prior to giving a favorable response to the first party.

What is needed is a "friend finder" system that is available to users in many different localities and, upon request, introduces parties, who, by their own standards, are well matched or compatible.

SUMMARY OF THE INVENTION

Accordingly, it is an object of this invention to provide an improved introduction system that brings together people who, by their own standards, are desirous of meeting.

Another object of this invention is to provide an introduction system that allows initial contact between "matched" persons by means other than an actual meeting, full identification of the parties being withheld until the first contact has been made with favorable responses.

A further object of the invention is to provide an introduction system that enables the user to locate and identify a potential partner in his close vicinity within minutes.

Still another object of the invention is to provide an introduction system that looks for best matches when more than one match is available.

Yet another object of this invention is to provide an improved introduction system that is available to a user at many different geographic localities, but having a range that can be limited by the user on any particular occasion.

Another object of this invention is to provide an introduction system that accepts and processes many competing requests for introduction without jamming.

A further object of this invention is to provide an introduction system that provides substantially immediate, real time results.

Yet another object of the invention is to provide an introduction system that automatically processes user requests for introduction and automatically notifies matched pair.

Still another object of this invention is to provide an introduction system that does not introduce the same parties more than one time.

With the introduction system in accordance with the invention, a plurality of first parties may seek out individual respective second parties, who may or may not exist. Seeking, identifying and introducing a respective first party and second party is accomplished by the introduction system, which initially is intermediate the parties. A person who wishes to become a user of the introduction system provides data concerning himself/herself and thereby characterizes the possibly nonexistent person he/she would like to meet. The inputted data may also include the desired characteristics in a prospective matching person, geographic location and time constraints for meetings. In other words, a would-be user informs the system who and where he/she is and the personal characteristics and interests to be matched in a second party desired for introduction. The data is entered into a centralized computer system that attempts to match the first party request against data of other participants in the system, the data including the other party's characteristics and interests in prospective introductions, and also including geographic and time constraints to match those of the seeking party.

Each party who is a user (subscriber) of the system has, and in most instances carries, a personal device whereon he/she is contacted by the introduction system, if a match is found, and an encoded membership or identification card that identifies the holder and his/her personal data. The personal device may be specially designed for this system, or the system may be adapted to use existing devices such as beepers, radio transceivers, cordless/cellular telpehones, and the like.

In a preferred embodiment, a system local control unit is located in a particular geographic area, e.g., a popular restaurant. A user entering the geographic area inputs his data to the local control unit using the encoded user identification card. A centralized computer connected to many terminals, or a computer in a self contained local control unit, compares the data against other persons who have used the same local control unit to input their respective data within a time period (e.g. same evening) that indicates the likelihood of a continued presence in the geographic area. If a valid match is made by the computer, the computer pages that matched pair via the personal devices that each user carries, and the paged persons return to the control unit to meet. A display or printout can indicate, for example, the matched parties' first names when one party inserts his/her identification card in the control unit. This information provides a more comfortable ambience for the first contact and minimizes potential mix-up where many people may simultaneously be relying on a particular terminal to find companions at that time.

In another embodiment of the invention where the personal device is solely a page-receiving device, upon being paged, the paged party telephones the local branch of the introduction system, and if both parties have responded to the paging, the first and second parties are connected and may converse for a limited time period.

In another embodiment of the invention, the personal devices include transceivers. When a match is found, the central system sets both parties' transceivers to operate at a common frequency, pages the parties, and allows the first party to speak with the matched second party over that frequency channel for a limited period of time.

Presumably, in all embodiments, if the voice communications between the first and second parties go favorably, previously withheld information, such as full names and addresses, can be exchanged. The parties future activities then become separated from the introduction system.

When both parties fail to respond to their respective page calls, the introduction system can leave a message for a responding party, suggest a later time for contact between the parties, and even suggest meeting places and times based upon the geographic location.

Local control units of the system may be provided in many different locations where the choice of potential partners is significant but opportunities to communicate are limited. For example, these local control units would be placed where time is spent in ordinary circumstances such as community centers, social clubs, exhibit halls, convention centers, auctions, theme parks, sporting facilities, office complexes, restaurants, parks, beaches, universities, shopping malls, museums, theaters (before curtain and after the final curtain), etc.

Local inputs at the local control units may be made by magnetic identification cards that the users carry, or the card may include a memory chip and perhaps a computer chip for automatic interaction through the local control unit with the centralized computer. Contact with the system may also be by keyboard entry at the local control unit or by dialing a particular phone number. Data may be inputted from a touch-tone telephone and the local control unit may have a display and/or printer to provide instructions and feed-back, e.g. a person's first name, to the user, including the results of a matching effort, after the user has been paged.

It should be understood, that when a "match" of two users has been made, it is not to imply that each and every parameter set out by the seeking party has been met. Certain mandatory factors, for example, religion, age ranges, educational background, may be required to be satisfied entirely whereas other factors such as hobbies and other preferences may be matched, for example, only with a 25% agreement. Such factors represent ground rules of the system, which are made known to the users, and form no part of the subject invention. Further, the individual entering the system at a particular time may have an option to indicate the degree of match that is acceptable on a given occasion. The computer then matches parties against the higher standard of the potential pair of participants.

The invention accordingly comprises the several steps and the relation of one or more of such steps with respect to each of the others, and the apparatus embodying features of construction, combinations of elements and arrangements of parts that are adapted to effect such steps, all as exemplified in the following detailed disclosure, and the scope of the invention will be indicated in the claims.

BRIEF DESCRIPTION OF THE DRAWINGS

For a fuller understanding of the invention, reference is made to the following description taken in connection with the accompanying drawings, in which.

DESCRIPTION OF THE PREFERRED EMBODIMENTS

Figure 1:
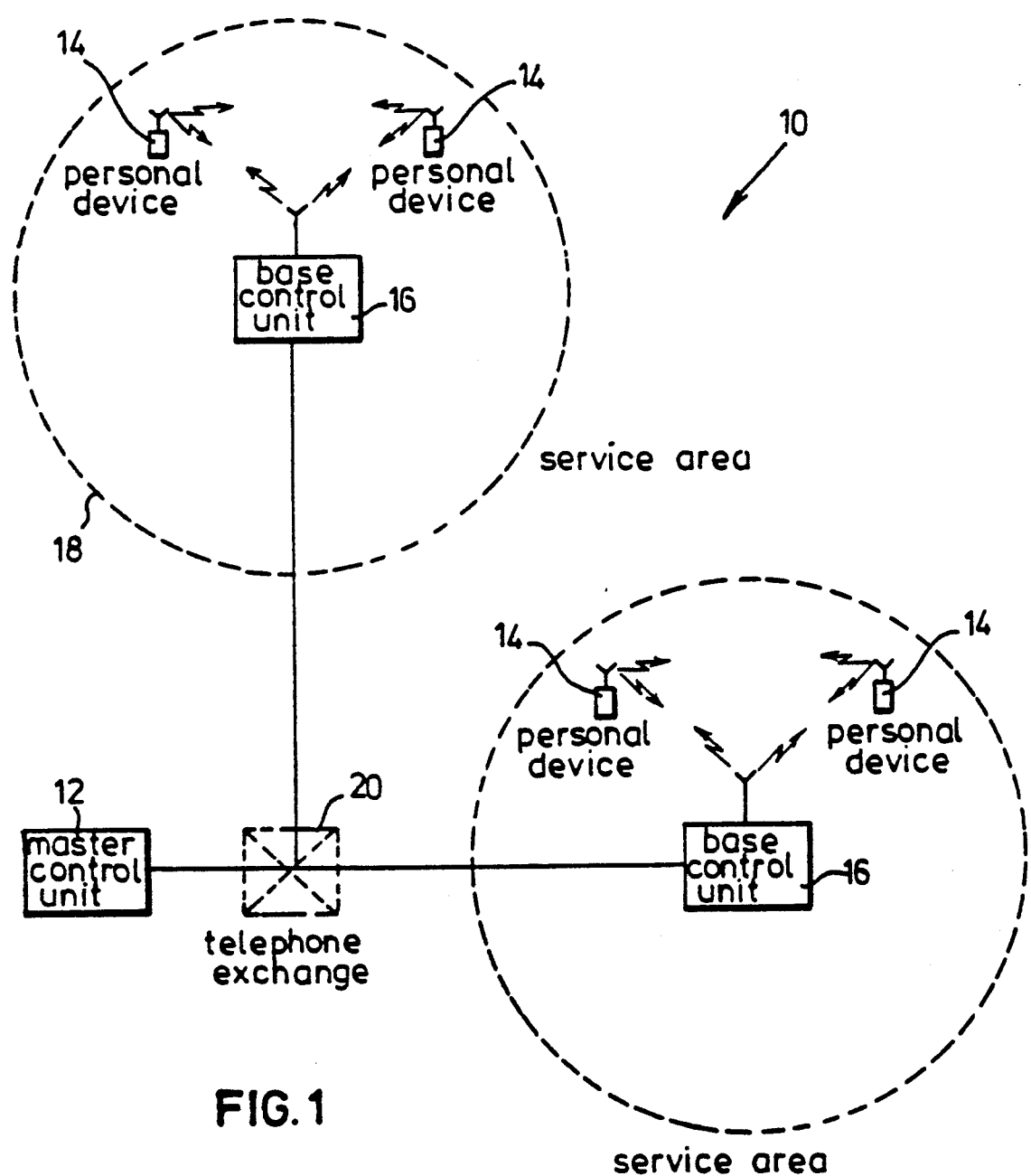
FIG. 1 is a functional drawing of the introduction system in accordance with the invention using a telephone exchange for communication between a master control unit and local control units.

An introduction system 10 in accordance with the invention includes a central or master control unit 12 that fulfills a number of functions, and a plurality of substations assigned to individual participants in the system. These substations are herein designated as personal devices 14. A plurality of base or local control units 16 have a defined function in a given area 18, and the local control units 16 are intermediate the central control unit 12 and the personal devices 14. By means of a public or private telephone exchange 20, each local control unit 16 can communicate, as necessary, with the central or master control unit 12, and users may also be in communication with the central or local control units 12, 16 by using the telephone exchange 20.

A basic feature of the introduction system is the provision of a large plurality of personal devices, which are respectively assigned to individual participants. Each personal device includes a paging system having an individualized address such that the central or local control unit 12, 16 can contact any personal device 14, which falls within the geographic service area 18 of the local control unit 16, to the exclusion of all other personal devices.

A person, who wishes to become a participant (subscriber) in the introduction system 10, enters data concerning himself/herself and his/her interests. Data may preferably be entered from a written application form submitted to an assigned address, or data may be entered by telephone to a local control unit 16 or to the master control unit 12. The data, for example, could be broken into two categories. Included in the first category are, mandatory criteria such as, for example, ethnic background, religious affiliation, education, income, age, height, smoking and drinking habits, etc. Additionally, the data can include users' interests, life style, hobbies, etc., and even desired characteristics of a compatible matching person.

After the data has been furnished and inputted, the new user is provided with an assigned personal device that is identified to that individual by an address code and may store a copy of the user's personal data. Other paraphernalia are also furnished, such as instruction booklets, encoded membership cards including the user's personal data, and renewal subscription forms, etc. From that time, the member can utilize the system in any available location that is covered by the system.

Whenever the user is in a service area 18 covered by the system 10, that person can inform the system of his availability at a certain location by calling the local telephone number of the local control unit 16 from a touch-tone telephone and, by responding to a voice menu, the user inputs information. This information can include, for example, his personal code assigned by the system 10, his present location, planned duration of stay in that service area 18, and the service area within which an introduction to a second party is desired.

Where a local control unit 16 is readily available, for example, in a restaurant, the user may enter the fixed data directly by inserting his membership card into the local control unit 16 and then by entering, using a local control unit keyboard, any requested variable information regarding the specific location for meeting and, for example, the planned duration of stay at that location.

It is assumed that generally a male person is seeking to make contact with a female and vice versa. It should be understood that the invention is not so limited. In a given geographic area where the user finds himself/herself, the user may seek out persons of the same sex having common interests, for example, playing tennis, fishing, etc.

In the particular service area 18 where a present request is being initiated, the local control unit 16 compares the user's entered personal data with the entered personal data of other users who are simultaneously and immediately available in the service area or particular location, for example, a museum or university, specified by the user. In an alternative embodiment where a personal device or card only identifies the user but provides no personal data, when the user is in a new service area, that is, in a geographic region or a particular place that he has not previously or recently visited, the local control unit may retrieve his data from the master control unit 12 by way of the telephone exchange 20. The local control unit 16 may store the data of its frequent users.

When a compatible couple is found, the system automatically notifies (pages) the two users by activating their personal devices. Several methods may be used to initiate an immediate meeting. The paged parties may call the local control unit 16 from any public or private telephone. After entering his/her personal identification code, the system will automatically interconnect the two parties if both parties have called in. This allows a telephone conversation for a predetermined period of time. The parties then make their own arrangements for a meeting, if their conversation advances in that direction.

On the other hand, rather than initiating a direct telephone connection, and especially, where both paged parties do not telephone at the same time in response to being paged, the local control unit 16 informs the calling party, using digitized/synthesized voice messages, the possible partner's first name, and place and time of a possible meeting. Users can then leave/retrieve a verbal message regarding a future meeting when contact is again made with the local control unit 16 at a designated time.

In another embodiment in accordance with the invention, users who have access to and make respective requests through a particular base control unit 16, return to that base control unit after being paged to receive a printout that includes a possible partner's first name and a listing of their shared interests. The time and place of the possible meeting is immediate and at the local control unit. Further, if both parties enter their respective identification data into the local control unit, a beeper will sound on the personal device of the first party to so enter his/her data, but only after the second party to return to the base control unit enters his/her identification. Further, if both parties enter their respective identification data into the local contral unit, a beeper will sound on the personal device of the first party to so enter his/her data, but only after the second party to return to the locl control unit enters his/her identification.

By using a conventional telephone from such places as home, office, car, etc, a user can call the local control unit 16 from any place within the coverage area 18 of the paging system. The user may also call from the place where a meeting is desired, for example, a museum. The user can inform the system about the duration of his availability and the geographic area to be covered. By virtue of the computer's speed in providing matching data, if a compatible couple is found simultaneously within any acceptable area, the system will page the users, substantially immediately, asking them to dial the base control unit 16 by telephone. After entering their personal codes, the system automatically interconnects them and allows a telephone conversation between the two people. In such a case, the personal device is a pager of the conventional type that has been adapted to the introduction system with a proper addressing and user identification code. Alternatively, the paged parties approach the local control unit, where the personal data was recently input to meet.

Following is an alternative introduction system in accordance with the invention that is again represented functionally in FIG. 1. Data is entered originally for each user into the master control unit 12, and stored as described above. When a person informs a local control unit 16 of his presence in a given geographic area, the stored data is scanned, looking for compatibility among the predefined parameters of the seeking party and the person being sought. The contact by the local control unit 16 between two matched parties is based on a radio communication, the use of ultrasonics, infra red radiation, etc., as compared to the public telephone system, that was used in an embodiment described above.

The central or master control unit 12, when used in an embodiment in accordance with the invention, exercises overall control over the local control unit 16 and may have a computer storage capacity for storing and evaluating the data pertaining to all of the participants. The individual personal devices 14 are generally battery powered units of portable nature that are equipped with signaling means, that is, buzzers, LEDs or the like, or they may be provided with voice radio communication means (transceiver) operative over a predetermined limited range.

The local control units 16 may be located in a plurality of locations in a given city, and each such unit is assigned a certain effective area 18 in which the unit 16 operates and in which it has adequate range and capability for making introductions. Features of various embodiments of such local control unit 16 are set out hereinafter. The local control units 16 temporarily store data of participants who have informed that unit about his/her presence in a given vicinity or location for a given period of time. Personal data need not be permanently stored in the local unit 16. During this period of time, the local control unit 16 scans the system memory for a compatible potential partner who has also announced his or her availability at such location during such time period. If such a compatible potential partner is found, and one may not exist, the local control unit 16 automatically establishes contact between the two participants. After making an introduction by a method indicated above, the local control unit 16 records this fact to prevent future repetition. A pair of users is only matched once. Where the personal devices 14 are provided with voice two-way communication means, in some circumstances a meeting can be arranged between such potential partners by themselves. Otherwise, contact with the local control unit 16 is necessary for effecting such a meeting.

In another alternative embodiment, when a new user joins the system, the master control unit or central unit 12 analyzes an applicant's questionnaire, by whatever format is used to originally input the information, and arranges his/her personal details and preferences in a particular format and assigns a personal address code for the individual. The master control unit 12 then adapts a personal device 14 for use by each individual subscriber by transferring the personal address code and personal data to a memory of the personal device. The master control unit 12 retains a record of information on the assigned address code and may retain the personal data in its memory. The master control unit 12 when maintaining data for each system user, on demand transfers data to a requesting base control unit 16 by way of communication means, such as the telephone lines (FIG. 1). Personal data is updated in the master control unit memory as new inputs are received. The master control unit can display information to users (subscribers) at a local control unit 16 by way of the telephone exchange 20 and a display device at the local control unit 16. Further, the master control unit 12 can periodically check the local control units 16 and initiate an alert in case any local unit is malfunctioning. The memory associated with the master control unit 12 may be located at the master control unit or remotely therefrom with suitable access means.

The master control unit 12 may include a computer, a computer to personal device interface, a computer to personal memory interface, a telephone modem or other communication means.

It is recognized that the favorable trends in technology and economics of data storage may in time eliminate any need for a central master control unit and its memory. Also, the ability of "identification" cards to store all personal data for an individual, and also to include a computer chip, may in time eliminate any need for long term personal data storage in the local control units 16.

In different embodiments, the local control unit 16 identifies the presence of a user by reading his/her personal address code and personal data from his/her memory unit (identification card), by keyboard or telephone input, or by receiving transmitted personal coded signals from the user's personal device. The local control unit 16 compares each user's requirements and characteristics with those of all potentially suitable users immediately available in the geographic area, and determines the best compatibilities. The local control unit 16 automatically assigns a discrete communication channel, where more than one channel is available, and switches the personal devices of the two chosen users to the assigned channel by sending appropriate coded signals to the personal devices of the selected parties. The transmissions from the users' transceivers are connected via the base control unit 16 that serves as an intermediate step between the two personal transceiver devices.

"Best" matches are accomplished by the computer based on a level of interest in an activity (for example, going to the opera) that a user indicates in the original application to, and entry of data into the introduction system. When several matches are simultaneously available, the computer can select the "best" match based upon the overall closeness in expressed interests of the potential pairs.

From the above description it is apparent that a variety of personal devices 14 can be used. In one embodiment of the invention, the received addressed signal triggers only a buzzer and the meeting is initiated by both subscribers approaching the local control unit by telephone as described above. In another embodiment of the invention, the received signal triggers voice communication between two personal devices that contain transceivers via the local control unit 16, which assigns a frequency channel. The personal device may be either a transponder or an interrogator; it may be capable of independent communication on one or more channels with other personal devices bypassing the local control unit 16. Messages may be displayed on an alphanumeric display.

In another alternative embodiment in accordance with the invention, where potential matching parties are expected to be geographically close together at the outset of a search, the personal devices 14 may include self-contained transceivers, memory means holding the user's personal data, a microprocessor, and some form of display or indicator. When the person is outside the service area 18 of a local control unit 16, on a periodically timed basis, for example, every thirty seconds, the transceiver transmits the user's personal data. Between these transmissions, the transceiver listens for data transmitted from other nearby personal devices and the processor in the personal device compares any incoming personal data with the user's stored data. When there is a match, the display (e.g., LCD) or buzzer of each matched person's personal device is activated. Where a display is used, the first name of the other party may appear. The parties can then converse by transceiver to complete meeting arrangements. Operation is autonomous and in real time without any intervention by a local control unit 16.

When such a personal device with an autonomously operable transceiver is brought within the service area 18 of a local control unit 16, signals from the local control unit 16 partially inactivate the user's personal device so that only reception and transmission of signals between the local control unit 16 and the personal device 14 is possible. Thus, the local control unit 16 prevents autonomous operation by a user of his/her personal device. The local control unit 16 then immediately matches interested parties within that geographic area 18 if a match exists. Matched users are paged by the local control unit 16 and an introduction can ensue by any suitable means described above, for example, on an assigned transceiver frequency channel, by telephoning the local control unit 16, by approaching the local control unit, etc. The personal devices may also include a cordless telephone and the local control unit can interconnect a matched pair of users.

When the user again leaves the geographic area 18 serviced by the local control unit 16, that is, transmissions from the local control unit no longer reach a user's personal device, the personal device reverts to the autonomous operational mode, described above, without reliance on the local control unit to provide introductions.

In general, where a user has checked into a particular geographic region (e.g., restaurant) by inserting his/her encoded identification card in a local control unit, the user will check out by again inserting his/her identification card and providing inputs as requested by the local control unit.

Figure 2:
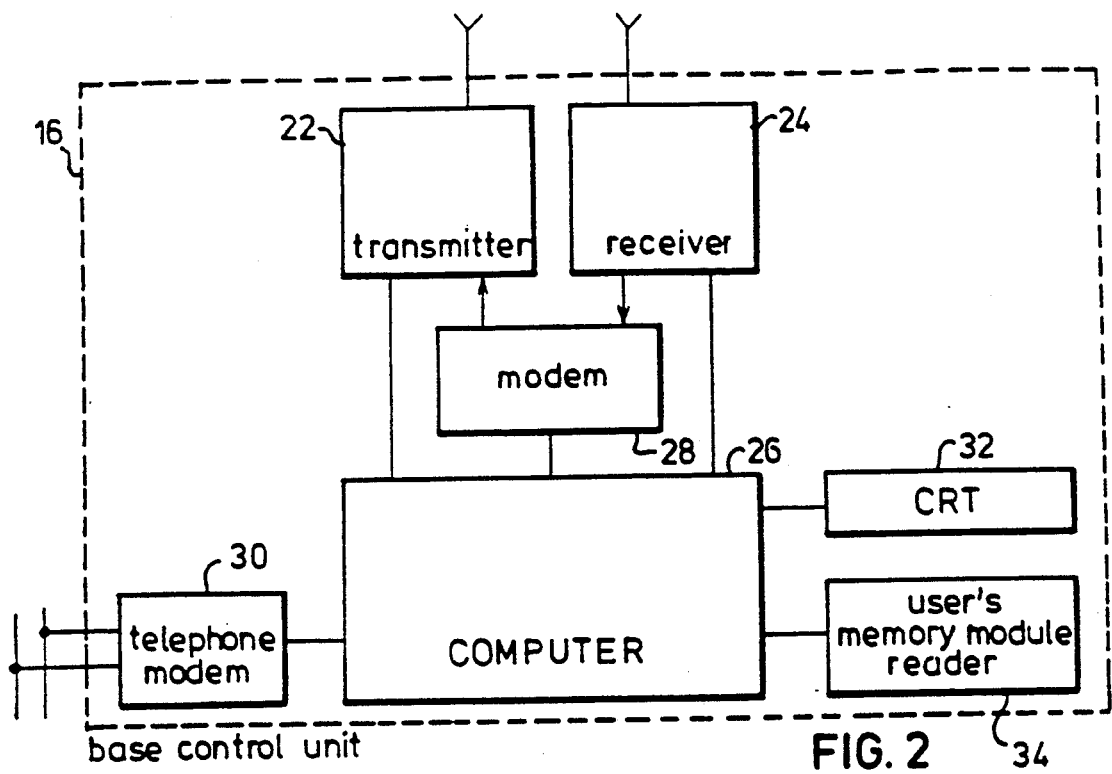
FIG. 2 is a functional diagram of a local control unit.

FIG. 2 is a functional diagram of a local or base control unit 16 having a transmitter 22 for contacting personal devices 14, a receiver 24 for receiving communication from personal devices 14 when such devices have transceiver capability, and a computer 26 that does local matching of users. A telephone modem 30 allows for interconnection with the master control unit 12 and with users when the mode of contact with the local control unit 16 is by telephone after the user is paged by the transmitter 22. A cathode ray tube 32 gives instructions to a user for inputting data, and also is used for delivering messages. A reader 34 is provided to take information from a user's identification card.

Figure 3:
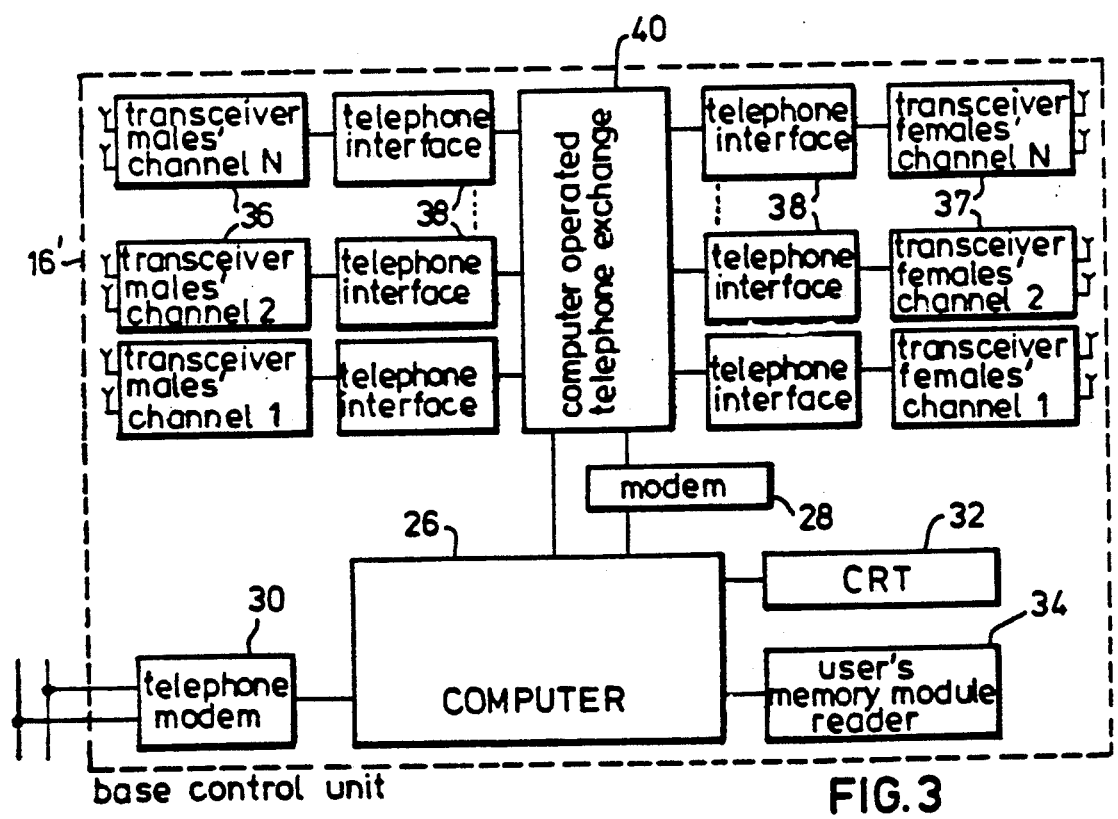
FIG. 3 is a functional diagram of an alternative embodiment of a local control unit.

FIG. 3 illustrates a more sophisticated local or base control unit 16', wherein there are a plurality of transceivers 36 operating on different channels (1 . . . N) that are reserved for contacting the personal devices 14 of men. There are also a plurality of channels 1 . . . N associated with transceivers 37 for contacting the personal devices 14 of female users of the system. The transceivers 36, 37 pass through telephone interfaces 38 to a computer operated telephone exchange 40. The local control unit 16' pages, by way of the transceivers 36, 37, both parties for an intended introduction. If both parties respond by way of their transceivers, the intermediate telephone exchange 40 connects the two parties allowing immediate communication by way of the local control unit 16'. In an alternative embodiment, not shown, after the computer 26 contacts two users by paging for an intended match, the transceiver in each user's personal device is assigned a channel that is common to both parties and the parties communicate directly by radio.

Figure 4A:
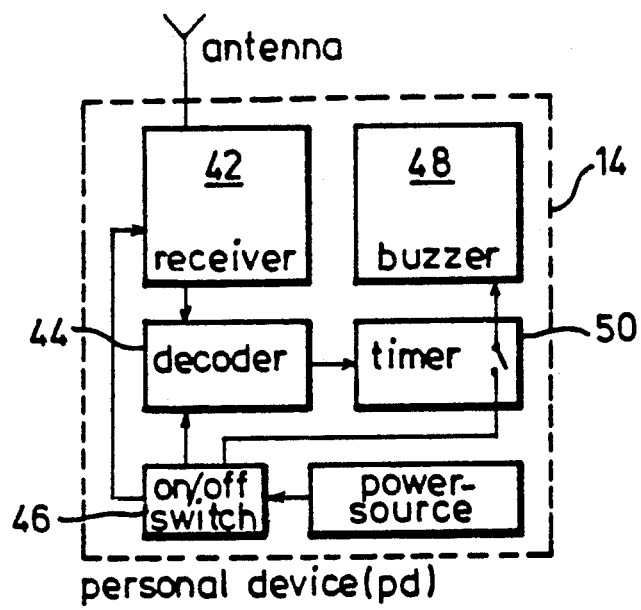
FIG. 4a is a personal paging device to be carried by a system user.

FIG. 4a is a functional block diagram of a personal device 14 that functions solely as a paging device. When a radio transmission is received from the base control unit 16 by way of the receiver 42, the signal is decoded in a decoder 44 to determine the addressee of the signal. The addressed personal device, if turned ON by the on/off switch 46, receives the transmission and activates a buzzer 48 for a limited time set in a timer 50. The user then must call the local control unit 16 by telephone, as described above. All other personal devices in the area receiving the transmitted coded signal, but not particularly addressed, do not respond.

Figure 4B:
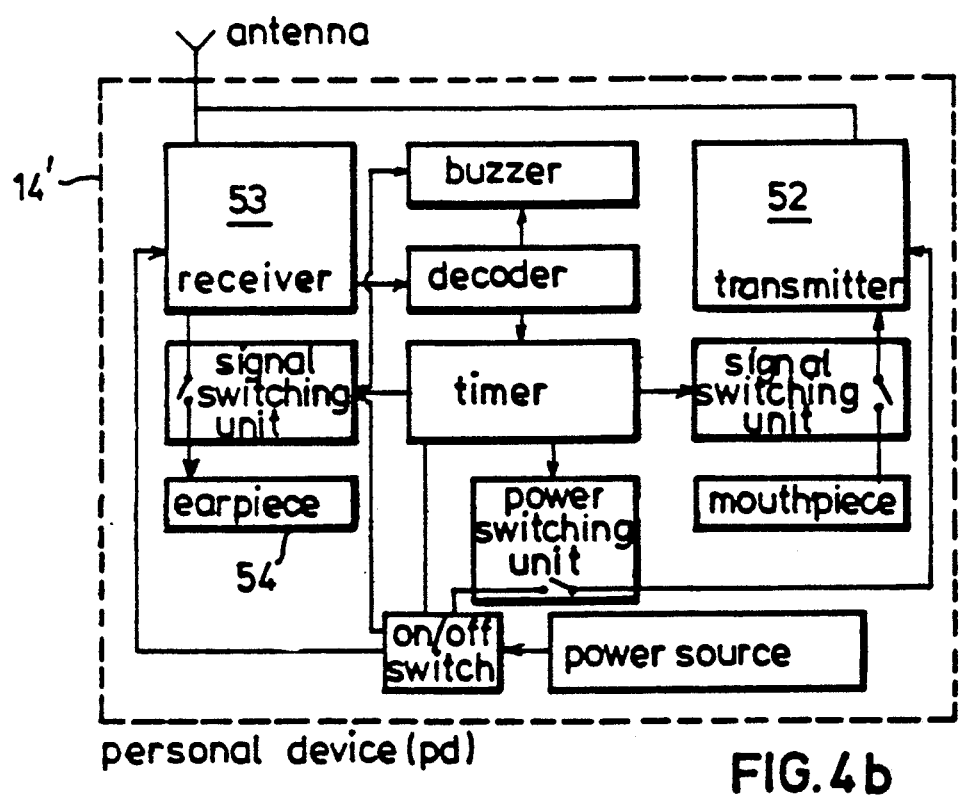
FIG. 4b is another personal device having transceiving capabilities, enabling voice communication to be carried by a user.

FIG. 4b is a functional diagram of an alternative personal device 14' that includes means for voice communication between the user and the control unit or between the matched pair. Such a personal device 14' can be used with a local control unit 16' as illustrated in FIGS. 2 and 3.

Figure 5B:
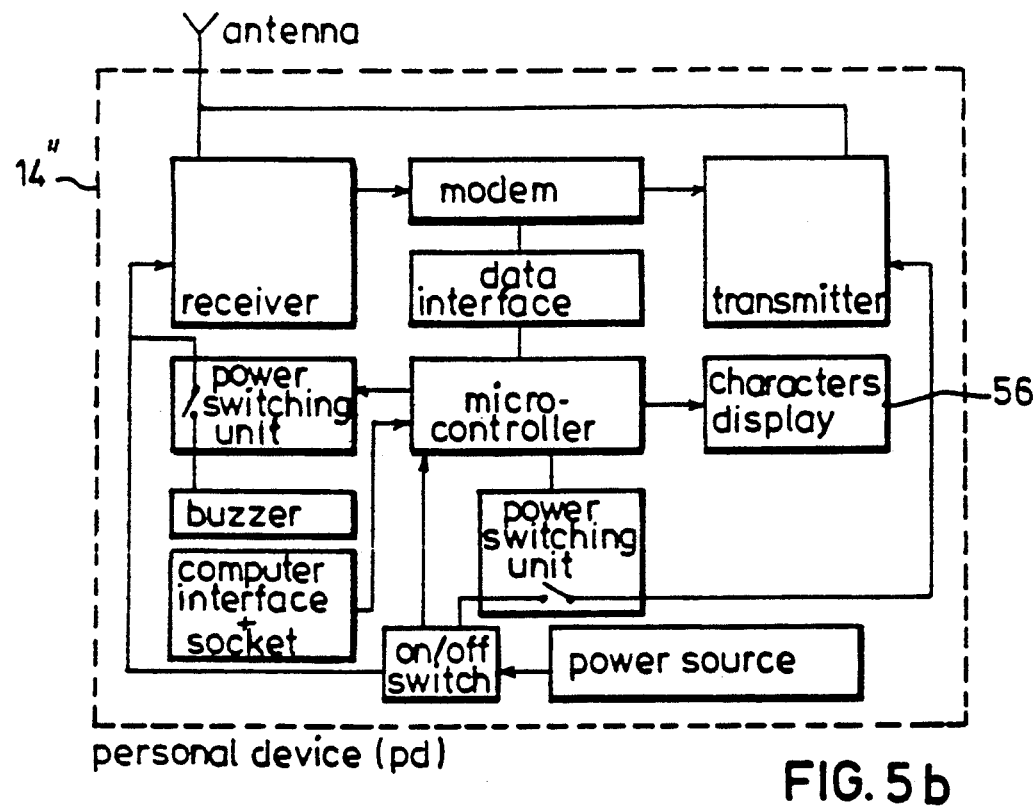
FIG. 5b is a personal device similar to FIG. 5a having a character display for indicating information.
Figure 5A:
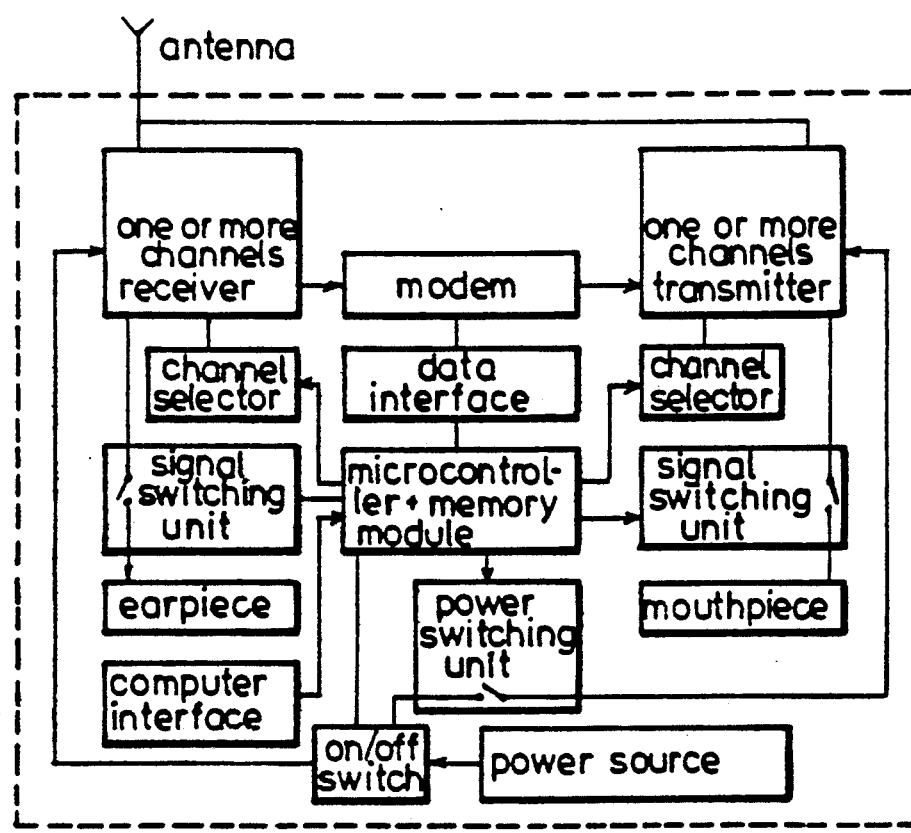
FIG. 5a is a personal device having capability for autonomous operation.

The personal device 14" of FIG. 5a allows for voice communication as in FIG. 4b but has elements such as the microcontroller, modem, data interface, etc. that enables autonomous operation while out of range of a base control unit. Instead of voice communication, the device of FIG. 5b provides a data display for indicating information of the matched person.

Figure 6:
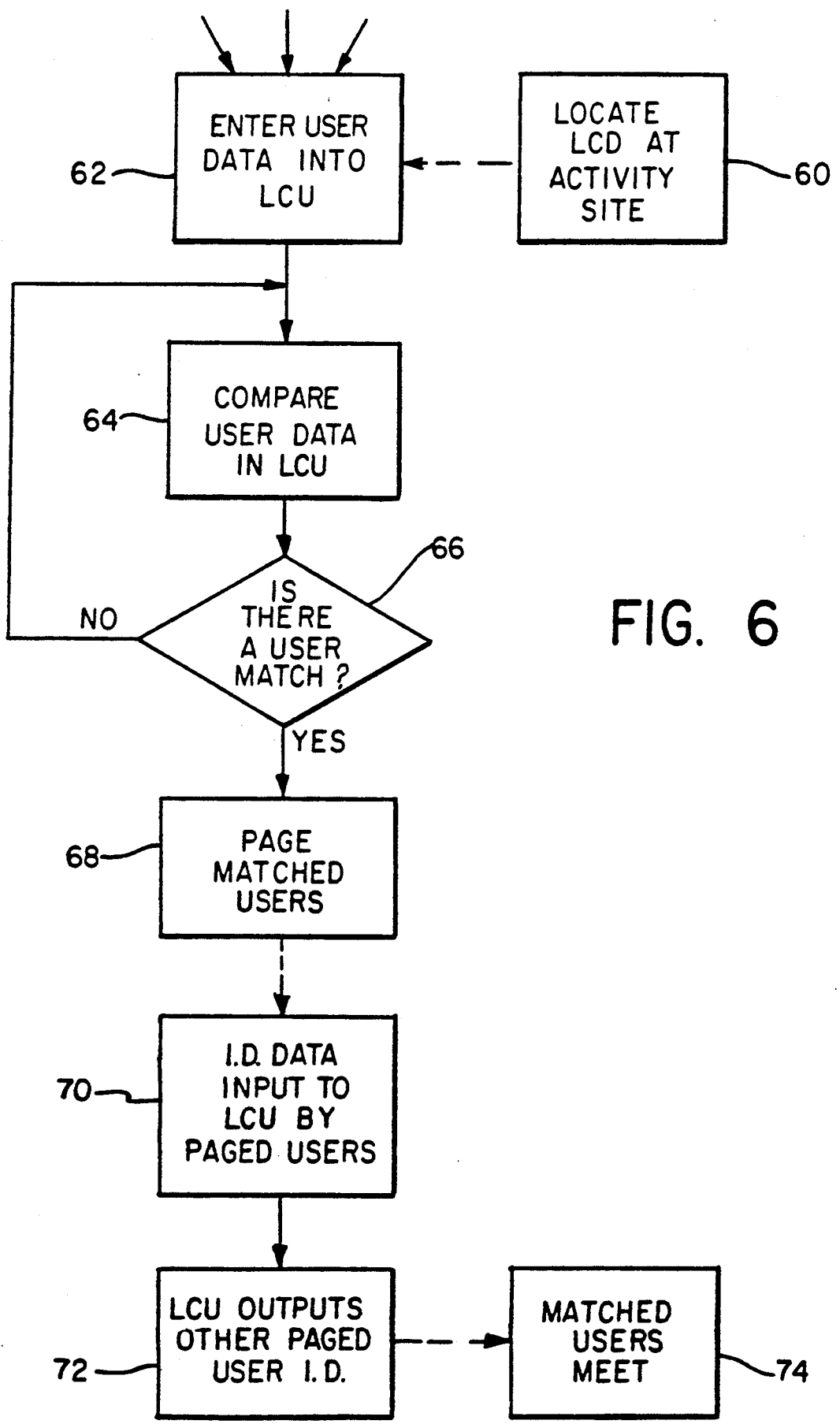
FIG. 6 is a functional flow diagram of the introduction system in accordance with the invention.

FIG. 6 is a flow diagram indicating the method of operation of an introduction system in accordance with the invention using a local control unit (LCU) that is located at a place where users tend to gather, for example, at a health club, museum, the theater, shopping center, etc., as indicated above. Positioning of the local control unit is indicated by functional block 60.

Users at the activity site enter their personal data into the local control unit (block 62). This is accomplished, for example, by using a coded magnetic card. The local control unit compares the data of the different users who have input their personal data (block 64) to determine whether compatability, i.e., a match, is indicated between a pair of users (block 66).

If there is no match, the local control unit continues to make comparisons as additional users enter their personal data. When a pair of users are found to be compatible, that is, matched, the local control unit pages the users (block 68) by activating the personal device which each user possesses.

At that time, the paged users, still unknown to each other, approach the local control unit and again enter (block 70) their personal identification data, for example, by means of the magnetic card mentioned above. At that time, the local control unit provides information to the user who has entered his/her identification. The information includes sufficient data to enable simple identification of the other member in the matched pair, for example, the first name of the other party (block 72). The matched users are then able to meet proximate the local control unit (block 74).

It should be understood that this flow diagram represents one of the many alternative embodiments described above and does not preclude any means of entering data into the local control unit (block 62), or any type of output by the local control unit (block 72) to identify the matched parties.

It will thus be seen that the objects set forth above, among those made apparent from the preceding description, are efficiently attained and, since certain changes may be made in carrying out the above method and in the constructions set forth without departing from the spirit and scope of the invention, it is intended that all manner contained in the above description and shown in the accompanying drawings shall be interpreted as illustrative and not in a limiting sense.

What is claimed:

1. An introduction system for participating users, comprising:
   a personal device for each user, said personal device being subject to activation by remote paging;
   user input means for each user for activating a local control unit, said user input means containing personal data defining each said user, respectively, by personal characteristics such as traits and interests;
   said local control unit including means for receiving the respective personal data inputted from a plurality of said user input means, said local control unit being located at a preselected site where users tend to gather and including computer means for comparing the inputted personal data of each said user with the personal data of other users, said other users within the same time frame having entered their personal data using their respective user input means;
   paging means associated with said local control unit for paging personal devices, said paging means being capable of activating the personal devices of a matched pair of users, said pair having been matched to predetermined standards by said computer means by comparison of said inputted personal data.

2. An introduction system as in claim 1, wherein said personal devices include transceiver means, said local control unit including transmitting means for activating the transceivers of said matched pair, respectively, for direct voice communication via said transceivers between the users in said matched pair.

3. An introduction system as in claim 1, wherein said personal devices of pairs of matched users are activated by one of radio, ultrasonic, and infrared transmission, said personal devices including reception means for receiving said transmission.

4. An introduction system as in claim 1, wherein said local control unit further includes means for receiving said respective personal data from users by way of telephone communication.

5. An introduction system as in claim 1, wherein said user input means is a user card having said personal data and user identification stored thereon.

6. An introduction system as in claim 1, wherein said local control unit includes at least one of display means and print out means for providing data concerning one user of said matched pair when the local control unit receives the identification data of the other user of said matched pair, after said matching.

7. An introduction system as in claim 1, wherein said local control unit includes memory means for storage therein of personal data of users located within a predetermined geographic area, said area being defined by the range of said paging means.

8. An introduction system as in claim 1, wherein said local control unit computer means includes record keeping means for storing the identifications of matched pairs, and checking means for preventing a rematching of previously matched pairs.

9. An introduction system as in claim 1, wherein said local contral unit is programmed to operate in substantially real time in processing user requests for matching.

10. An introduction system as in claim 1, and further comprising central control means including memory means for storing personal data and computing means for comparing users' personal data, and means for enabling communication with said local control unit, said central control means being adapted to respond to requests for data from said local control unit.

11. An introduction system as in claim 1, wherein said computer means discriminates between users by said predetermined standards, when more than one match is concurrently present, the most compatibly matched pair being selected for paging.

12. An introduction system as in claim 1, wherein said local control unit stores personal data of users, said computer means initiating a comparison when a user enters a request indicating desired time frame and place for introduction to another user.

13. An introduction system as in claim 1, wherein said local control unit includes means for receiving telephone communications from matched users.

14. A method for introducing users of an introduction system, including the steps of:
   providing a local control unit located at a preselected site where users tend to gather, said local control unit including computer means;
   providing a personal device for each said user, said personal device being subject to activation by remote paging;
   providing paging means associated with said local control unit for paging said personal devices;
   providing user input means for activating said local control unit;
   inputting individually into said local control unit, by using said user input means, the personal and identification data, respectively, of each user substantially concurrently seeking a matched introduction;
   comparing in said local control unit the entered user personal data to find matched pairs of users, each user's data being compared by said computer means, said matching being effected to predetermined standards of compatibility;
   paging individually the users in a matched pair;
   having paged users communicate with said local control unit.

15. A method as in claim 14, and further comprising the step:
   imparting information regarding one paged user to the other paged user in a matched pair when said other paged user communicates with said local control unit.

16. A method as in claim 14, wherein said paged users individually communicate with said local control unit by telephone, and further comprising the step:

interconnecting the telephones of said matched paged users, direct voice communication between said matched users being enabled by telephone.

17. A method as in claim 14, wherein said paged users individually communicate with said local control unit by transceiver and further comprising the step:

activating said transceivers of said matched pair to operate on the same frequency channel, direct voice communication between said matched users being enabled by two-way radio communication.

18. A method as in claim 14, wherein said personal and identification data is entered into said local control unit by one of an encoded card, telephone communication, radio, infrared and ultrasonic transmission.

19. A method as in claim 14, wherein said introduction system includes local terminals connected to and remote from said local control unit, and said user inputs to and communications with said local control unit are by way of said local terminals.

20. A method as in claim 14, wherein said personal devices include a beeper, and said paged user's communication with said local control unit further comprising the steps:

having each paged user enter his/her identification data into said local control unit;

sounding the beeper of the first paged user to enter his/her identification data after the second paged user enters his/her identification data.

21. An introduction system for participating users, comprising:

a personal device for each user, said personal device being subject to activation by remote paging;

user input means for each user for activating a local control unit, said user input means containing personal data defining each said user, respectively, by personal characteristics such as traits and interests;

said local control unit including means for receiving the respective personal data inputted from a plurality of said user input means, said local control unit being located at a preselected site where users tend to gather and including computer means for comparing the inputted personal data of each said user with the personal data of other users, said other users within the same time frame having entered their personal data using their respective user input means;

paging means associated with said local control unit for paging personal devices, said paging means being capable of activating the personal devices of a matched pair of users, said pair having been matched to predetermined standards by said computer means by comparison of said inputted personal data;

said personal devices including transceiver means, memory means and computer means, and indicating means, said transceivers having at least two modes of operation, the first mode of operation being initiated by activation from said local control unit, the second mode of operation being autonomous and wherein said transceiver periodically broadcasts the user's personal data, and when not broadcasting said transceiver listens for similar broadcasts from other user personal devices, said computer means in said personal device comparing personal data in said received data with the user's personal data stored in said personal device memory means, said indicating means in said personal device giving indication to said user when said comparing yields a match of personal data in accordance with said predetermined standards.

22. An introduction system as in claim 21, wherein said local control unit further includes telephone switchboard means, said local control unit being capable of receiving telephone calls from users in said matched pairs, respectively, and interconnecting said calls for direct voice communication between the users in said matched pair.

23. An introduction system as in claim 21, wherein said local control unit includes memory means for storage therein of personal data of users of said local control unit.

24. An introduction system as in claim 21, wherein said local control unit in combination with said personal devices includes transmitting means for disabling said second transceiver mode in any personal device whenever said personal device comes within the geographic region reached by transmission from said local control unit transmitting means.

25. An introduction system as in claim 21, wherein said computer means enables voice communication between the transceivers of said matched pair of users.

26. An introduction system as in claim 21, wherein said personal devices of pairs of matched users are activated by one of radio, ultrasonic, and infrared transmission, said personal devices including reception means for receiving said transmission.

27. An introduction system as in claim 21, wherein said local control unit computer means includes record keeping means for storing the identification of matched pairs, and checking means for preventing a rematching of previously matched pairs.

* * * * *